(12) United States Patent
Ben Abdelaziz

(10) Patent No.: US 12,027,167 B2
(45) Date of Patent: Jul. 2, 2024

(54) METHOD, DEVICE, AND PROGRAM FOR CUSTOMIZING AND ACTIVATING A PERSONAL VIRTUAL ASSISTANT SYSTEM FOR MOTOR VEHICLES

(71) Applicant: FAURECIA INTERIEUR INDUSTRIE, Nanterre (FR)

(72) Inventor: Omar Ben Abdelaziz, Tille (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 407 days.

(21) Appl. No.: 17/421,011

(22) PCT Filed: Dec. 27, 2019

(86) PCT No.: PCT/EP2019/087115
§ 371 (c)(1),
(2) Date: Jul. 6, 2021

(87) PCT Pub. No.: WO2020/141150
PCT Pub. Date: Jul. 9, 2020

(65) Prior Publication Data
US 2022/0020374 A1    Jan. 20, 2022

(30) Foreign Application Priority Data

Jan. 4, 2019  (FR) ...................... 19 00076

(51) Int. Cl.
*G10L 15/22*   (2006.01)
*G10L 15/08*   (2006.01)

(52) U.S. Cl.
CPC ............. *G10L 15/22* (2013.01); *G10L 15/08* (2013.01); *G10L 2015/088* (2013.01); *G10L 2015/223* (2013.01); *G10L 2015/227* (2013.01)

(58) Field of Classification Search
CPC ... G10L 15/22; G10L 15/08; G10L 2015/088; G10L 2015/22; G10L 2015/227
(Continued)

(56) References Cited

U.S. PATENT DOCUMENTS 7,602,947 B1   10/2009  Lemelson
2009/0284359 A1  11/2009  Huang et al.
(Continued)

FOREIGN PATENT DOCUMENTS

EP   1539521 A1   6/2005
EP   2099652 A2   9/2009
(Continued)

OTHER PUBLICATIONS

R. Lind, R. Schumacher, R. Reger, R. Olney, H. Yen and R. Freeman, "The network vehicle-a glimpse into the future of mobile multi-media," 17th DASC. AIAA/IEEE/SAE. Digital Avionics Systems Conference. Proceedings (Cat. No.98CH36267), Bellevue, WA , USA, 1998, p. 121/1-121/8 vol.2, doi: 10.1109/DASC.19 (Year: 1998).*

(Continued)

*Primary Examiner* — Bharatkumar S Shah
(74) *Attorney, Agent, or Firm* — Reising Ethington P.C.

(57) ABSTRACT

A method for customizing and activating a personal virtual assistant (PVA) in a motor vehicle. The method includes: activating a PVA management system, determining a customized mode of use of the personal virtual assistant, and activating the customized mode of use of the personal virtual assistant. A device for carrying out the method is also included.

14 Claims, 3 Drawing Sheets

(58) Field of Classification Search
USPC .......................................................... 704/275
See application file for complete search history.

(56) References Cited

U.S. PATENT DOCUMENTS

| | | |
|---|---|---|
| 2010/0049528 A1 | 2/2010 | Zeinstra et al. |
| 2013/0169410 A1 | 7/2013 | Amselem |
| 2014/0136187 A1 | 5/2014 | Wolverton et al. |
| 2014/0244259 A1 | 8/2014 | Rosario |
| 2017/0235361 A1* | 8/2017 | Rigazio .................. G06F 9/453 715/710 |
| 2018/0144590 A1 | 5/2018 | Mixte et al. |
| 2019/0094038 A1* | 3/2019 | Oh ...................... B60R 16/0373 |
| 2020/0075001 A1* | 3/2020 | Kursar .................. H04W 4/029 |

FOREIGN PATENT DOCUMENTS

| | | |
|---|---|---|
| EP | 2573727 A1 | 3/2013 |
| EP | 2798634 A1 | 11/2014 |
| WO | 2009142920 A1 | 11/2009 |
| WO | 2013101051 A1 | 7/2013 |
| WO | 2018094254 A1 | 5/2018 |
| WO | 2020141150 A1 | 7/2020 |

OTHER PUBLICATIONS

R. Lind, R. Schumacher, R. Reger, R. Olney, H. Yen and R. Freeman, "The network vehicle-a glimpse into the future of mobile multi-media," 17th DASC. AIAA/IEEE/SAE. Digital Avionics Systems Conference. Proceedings (Cat. No.98CH36267), Bellevue, WA, USA, 1998, p. 121/1-121/8 vol.2, doi: 10.1109/DASC. (Year: 1998).*
International Search Report with English Translation corresponding to International Application No. PCT/ EP2019/087115, dated Mar. 12, 2020, 5 pages.
Written Opinion with English Translation corresponding to International Application No. PCT/EP2019/087115, dated Mar. 12, 2020, 5 pages.

* cited by examiner

METHOD, DEVICE, AND PROGRAM FOR CUSTOMIZING AND ACTIVATING A PERSONAL VIRTUAL ASSISTANT SYSTEM FOR MOTOR VEHICLES

TECHNICAL FIELD

The present disclosure relates to a method, device, and program for customizing and activating a personal virtual assistant for motor vehicles.

PRIOR ART

Patent EP2798634 describes a voice recognition method based on the use of a set of dynamically maintained grammar elements. A plurality of grammatical elements can be identified, and the grammatical elements can be ordered based at least in part on contextual information; in other words, contextual information can be used to guide the speech recognition. Once a speech input is received, the ordered plurality of grammatical elements can be evaluated and a correspondence between the received speech input and a grammatical element included in the plurality of grammatical elements can be determined.

SUMMARY

The present disclosure relates in particular to a method for customizing and activating a personal virtual assistant (or PVA, or VPA for virtual personal assistant) in a motor vehicle, comprising: at least one seat suitable for accommodating at least one user, at least one imaging device having a field of view configured to include said user seated in the seat, at least one central processing unit communicating at least with said at least one imaging device, the method comprising at least:
  activation of a PVA management system, from said central processing unit,
  determination of a customized mode of use of the personal virtual assistant,
  activation of said customized mode of use of the personal virtual assistant.

This makes the process of customizing and activating a PVA more intuitive for the user, activating only on demand and enabling less consumption of energy resources and use of computer memory.

In particular embodiments, the PVA management system is activated by carrying out:
  activation of said imaging device,
  detection of at least one event indicating the presence of said user.

In addition, determining the customized mode of use of the PVA comprises:
  capture of least one image, by said at least one imaging device,
  comparison of said at least one captured image with pre-existing user image data,
  determination of a customized mode of use of the personal virtual assistant, by said central processing unit, based on the result of said comparison.

In addition, the customized mode of use comprises:
  a default operation if the result of said comparison is an absence of recognition of the user or recognition of a user for whom the central processing unit cannot access a preference for the language of said PVA system or for the language of the wake words,
  absence of operation if the result of said comparison is recognition of a user who does not wish to use the personal virtual assistant,
  customized operation if the result of said comparison is recognition of a user for whom the central processing unit can access a preference for the language of said PVA system or for the language of the wake words.

In addition, when the customized mode of use is a customized operation, the method comprises:
  voice output by at least one sound-emitting device, at the command of said central processing unit, of welcome words in a language of the personal virtual assistant that is part of the user's previously stored preferences.

When the customized mode of use is a default operation, the method further comprises:
  voice output by a sound-emitting device, in a first predefined language, at the command of said central processing unit, of welcome words and of a proposal to store an identity and a language preference for said user of the PVA system.

In addition, the method comprises:
  capture, by an acoustic sensor, of a user's voice response to said proposal,
  detection of a language used in said voice response.

In addition, in the event of no response to said proposal by the user during a predetermined period of time, said method comprises voice output by said sound-emitting device, in a second predefined language, at the command of said central processing unit, of said welcome words and a new proposal to store the identity and language preference of the user of said PVA system.

According to one particular embodiment, said second predefined language is selected based on geolocation data of said vehicle.

In addition, in the event of no response to the new proposal by the user during a predetermined period of time or in the event of the user refusing to store his or her identity, the method comprises:
  voice output by said sound-emitting device, at the command of said central processing unit, of said welcome words in different predefined languages,
  voice output by said sound-emitting device, at the command of said central processing unit, of a request to speak predefined wake words in the preferred language of said user.

In addition, if there is no response to the proposal for a default operating mode during a predetermined period of time, the personal virtual assistant is deactivated.

In addition, the determination of a customized mode of use of said personal virtual assistant comprises at least:
  capture, by an acoustic sensor, of a user's voice message;
  detection of the language used in said message; and
  determination of a customized mode of use of the personal virtual assistant, by said central processing unit, based on the result of said detection.

In addition, said voice message of the user is a predefined message.

In addition, said predefined message comprises wake words for the personal virtual assistant.

The present disclosure also relates to a device for activation of a personal virtual assistant system in a vehicle, the device for activation comprising:
  at least one seat suitable for accommodating a user,
  at least one imaging device having a field of view configured to include said user when he or she is seated in the seat, at least one central processing unit comprising a computer program implementing a personal virtual assistant, said central processing unit communicating with said at least one imaging device and being configured for:
- activating a PVA management system on command, from said central processing unit,
- determining a customized mode of use of the personal virtual assistant,
- activating said customized mode of use of the personal virtual assistant.

Furthermore, the present disclosure also relates to a vehicle comprising a device for activation of a personal virtual assistant.

The present disclosure also relates to a computer program suitable for implementing the method as defined above.

BRIEF DESCRIPTION OF DRAWINGS

Other features and advantages will become apparent in light of the following disclosure of one embodiment, given as a non-limiting example, with reference to the accompanying drawings.

DESCRIPTION OF EMBODIMENTS

In the various drawings, the same references designate identical or similar elements.

Figure 1:
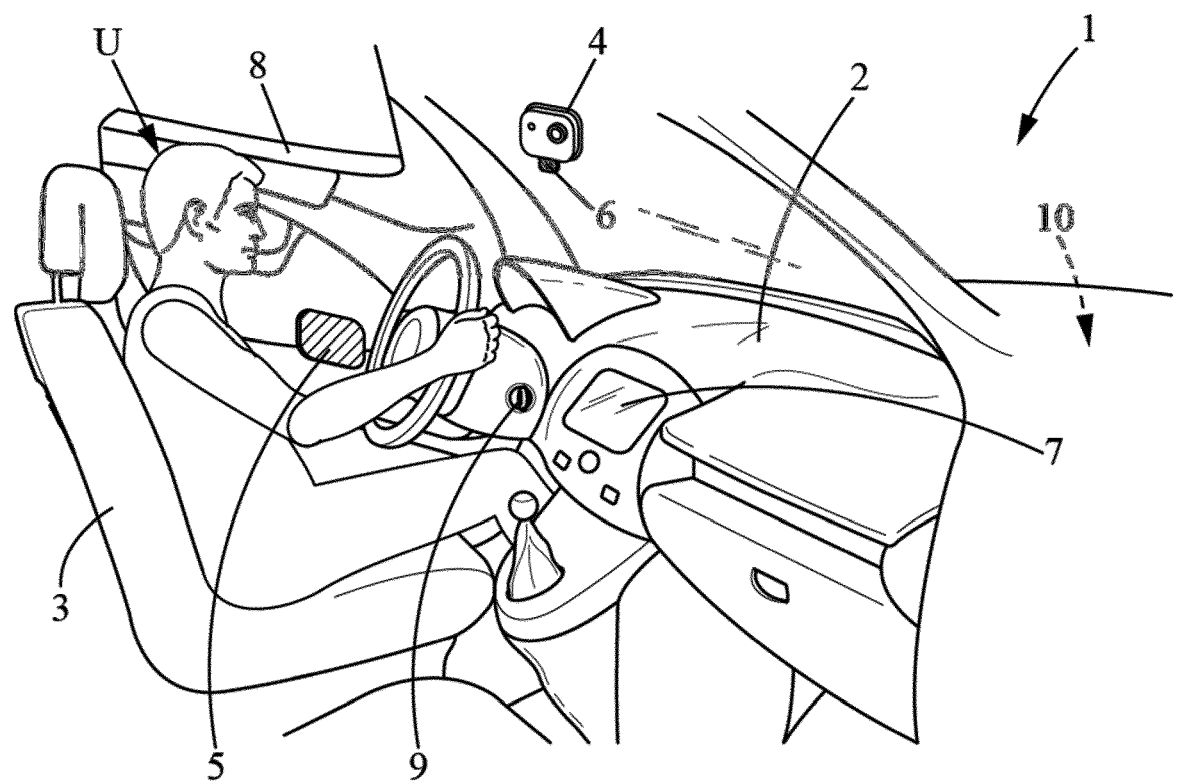
FIG. 1 schematically shows the interior of a vehicle with a user activating a PVA system, according to one embodiment of the present disclosure.

FIG. 1 schematically shows an interior 2 of a motor vehicle 1, with a user U seated on one of the seats 3 of the vehicle. The user U may for example be the driver of the vehicle 1. According to one embodiment of the present disclosure, the user U may want to customize a PVA system of the vehicle 1. In the example represented, the PVA system is associated with a camera 4, a speaker 5, a microphone 6, and a display screen 7, but it could be associated with other elements.

The activation process explained below may be controlled by physical events interpreted by sensors integrated into said vehicle 1, and said events associated with the presence of a user U, such as an opening of the door 8, insertion of the ignition key 9 of the car 1, detection by the camera 6 of the presence of a user U in the seat 3, change in pressure detected in the seat 3 related to the weight of the user 1, a starting of the engine 10 of the vehicle 1, or by actuation of a start button 11 on the display screen 7.

Figure 2:
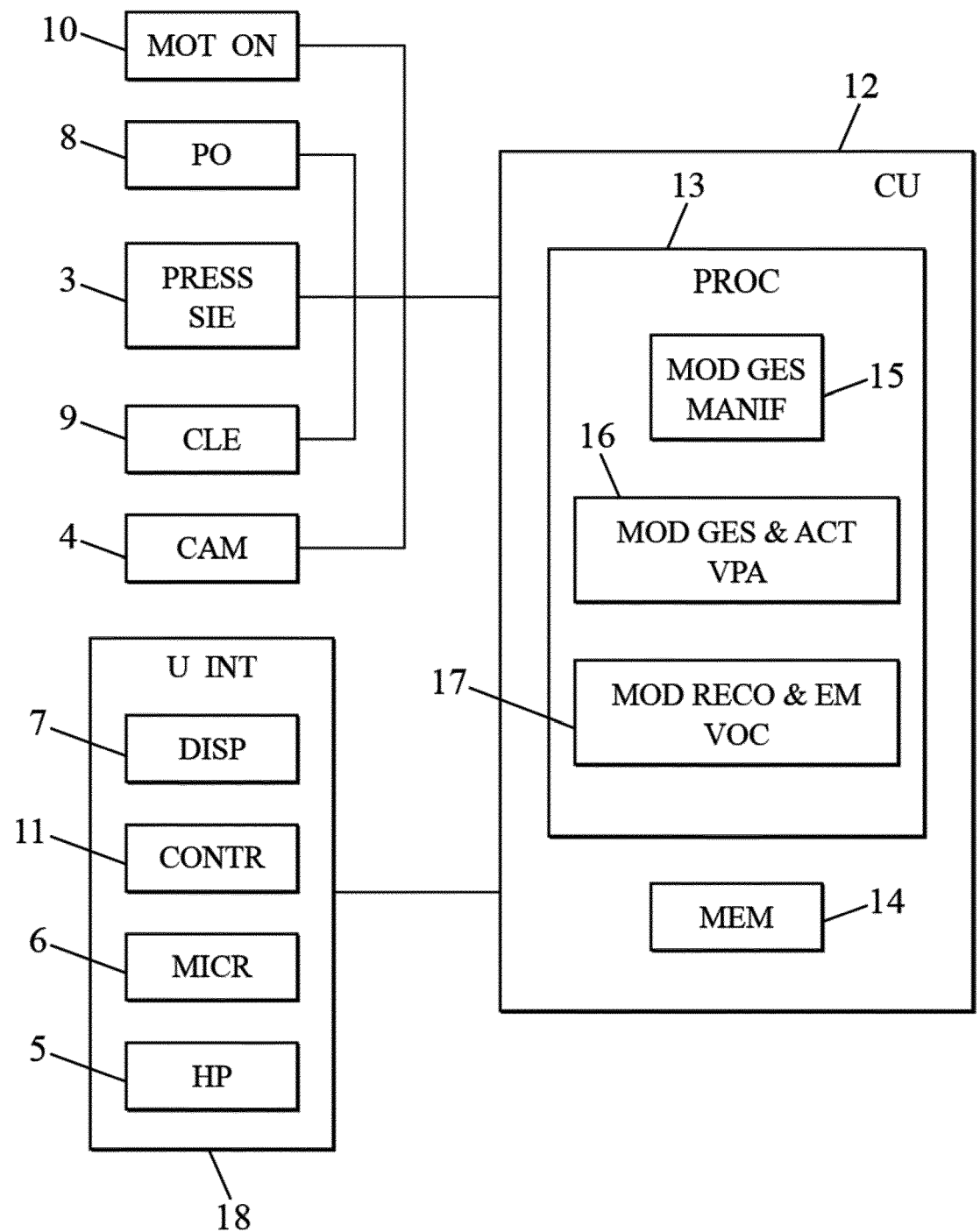
FIG. 2 is a block diagram showing the components of the device for activation of a PVA system of the vehicle of FIG. 1.

As represented in FIG. 2, said at least one camera 4 (CAM), said at least one speaker 5 (HP), said at least one microphone 6 (MICR), and said at least one display screen 7 (DISP) can communicate with a central processing unit 12 (CU) of vehicle 1, for example an on-board computer of the vehicle 1.

In addition, the sensors interpreting the physical events of the presence of a user U of the vehicle 1 such as said pressure on the seat 3, said detection by the camera 4 of a user U in the seat 3, said opening of the door 8 of the vehicle 1, said presence of the ignition key 9 of the vehicle 1, said starting of the engine 10 of the vehicle 1, and said start button, may also communicate with the central processing unit 12.

The central processing unit 12 may comprise in particular at least one processor 13 (PROC) and at least one memory 14 (MEM). The processor 8 may in particular execute a software module for managing physical events 15 (MOD GES MANIF), and a software module for managing and activating a personal virtual assistant 16 (MOD GEST & ACT PVA) coupled to a software module for recognition and voice output 17 (MOD RECON & EM VOC), the operation of each of these software modules to be described below.

The central processing unit 12 may also communicate with a user interface 18 (U INT), which may comprise for example the display screen 7 (DISP) controlled by the central processing unit 7 and a control device 11 (CONTR). In one embodiment, the control device 11 may optionally be limited to one control button or a few control buttons. In another embodiment, the display screen 7 is touch-sensitive and the control device 11 may be integrated with the display screen 7 (for example, the control device may have one or more areas displayed on the screen to serve as touch button(s)). The user interface 18 may also include at least microphone 6 and at least speaker 5, to enable the user U to issue and receive voice commands.

Figure 3:
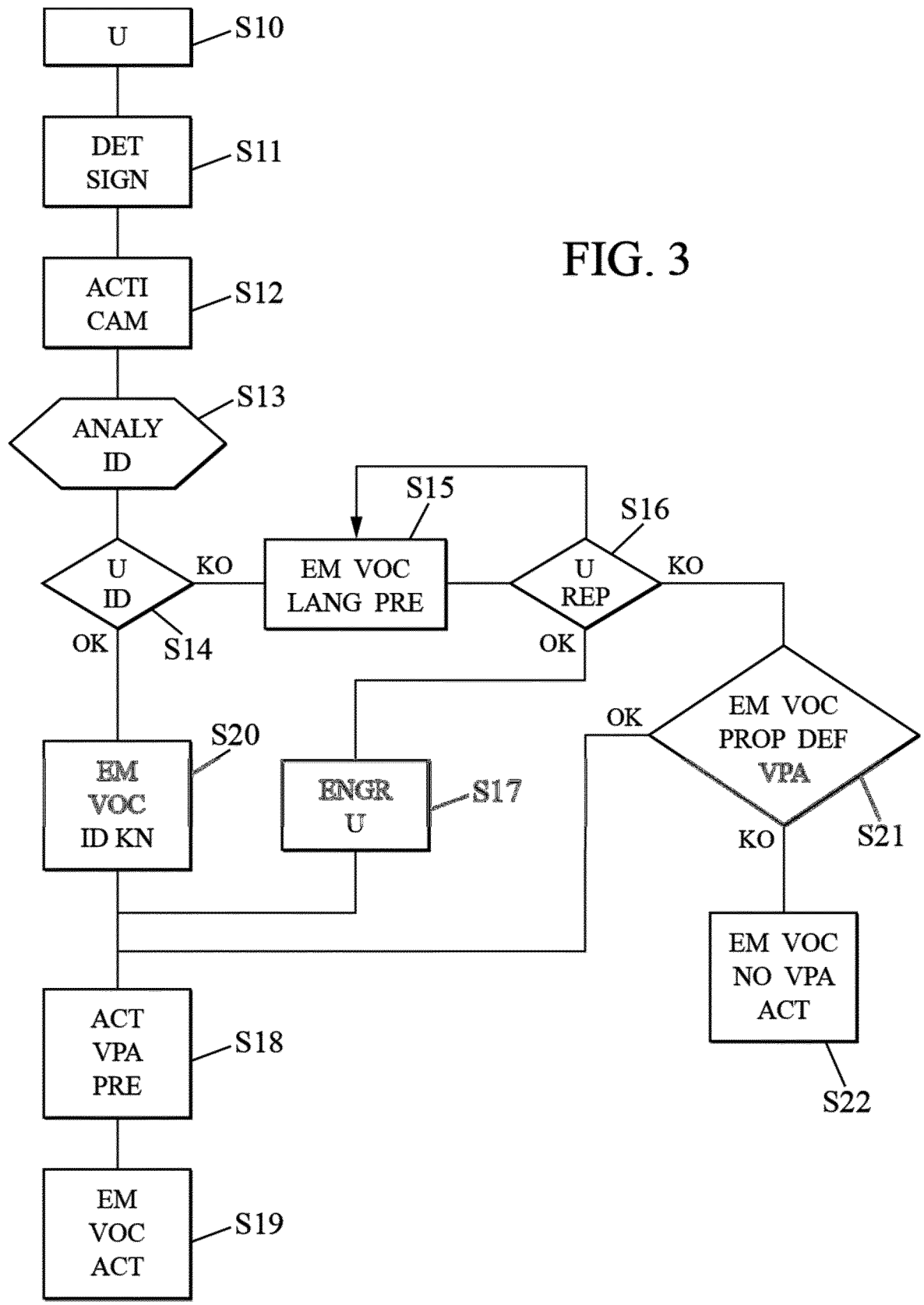
FIG. 3 is a flow chart of the steps enabling implementation of the method according to one embodiment of the present disclosure.

As represented in FIG. 3, the physical events management software module 15 can be configured to identify the arrival of a user in the vehicle 1 (particularly the driver) in step S10, for example with the help of said at least one camera or of any other sensor defined above (step S11).

The PVA management and activation software module 16 can activate at least one device among said camera 4, said speaker 5, and said microphone 6 (step S12). The PVA management and activation software module 16 can be configured to then determine who the user U is (step S13—"ANALY ID").

More specifically, the PVA management and activation software module 16 can compare the image of the user U captured by said at least one camera 4 to preexisting data of images of users of the vehicle 1, stored in memory 14, and can determine a customized operating mode of a PVA. This determination can be carried out by any known facial recognition software, possibly incorporating artificial intelligence.

If the user is not recognized or if a user is recognized for whom the central processing unit cannot access stored preferences (step S14, "U ID, KO"), a default operating mode of said PVA is determined, and a step may be performed of voice output (step S15) of welcome words in a first predefined language as well as voice output of a proposal to store the identity of the user U and the associated preferences in the PVA system.

As an example, a user's preferences can be stored in memories located remotely and accessible by telecommunication means.

This voice output step S15 is controlled by the PVA management and activation software module 16 by means of said at least one speaker, as well as by the recognition and voice output module 17.

In step S16, the recognition and voice output module 17 analyzes the user's response to said proposal, captured by said acoustic sensor. In the absence of a response during a predetermined period of time, step S15 is carried out again in a second predefined language. Once the identity and the configuration of preferences are established for the user U, the user U indicates in step S16 controlled by the PVA management and activation software module 16, whether he or she wishes the data related to his or her identity and the preferences tied to a customized operating mode of a PVA system to be kept for later use.

Preferences can also be selected with the aforementioned control device 11, possibly combined with the display screen 7 if it is a touch screen as explained above.

As an example, the predetermined duration can be defined as a time greater than or equal to 10 seconds, and said second predefined language can be selected according to the geo-location data of the user's vehicle, or can be a default language such as English.

In the case where the user wishes his or her data to be kept, step S17 is carried out which allows the data to be recorded in a database stored in memory 14 or in any other memories located remotely and accessible by telecommunication means. This step may be carried out only once for a new user.

As an example, in steps S15, S16 and S17, in the case of a default operating mode of a PVA system, the recognition and voice output software module 17, via said central processing unit 7, emits welcome words from said speaker 5 in a predefined language. The recognition and voice output software module 17 also vocally offers the user U the option of saving his or her data relating to his or her identity U and preferences in the memory 14 of the central processing unit 7 for later use. For example, following the instructions of the recognition and voice output software module 17, the user speaks the predefined wake words in the user's language. Predefined wake words is understood to mean all words or expressions recorded and configured in the PVA management system and which, when spoken by the user, activate the process of interaction with the PVA system. For example, the user speaks an example of predefined wake words such as "Bonjour Faurecia", and the microphone 6 converts an audio signal into an electrical signal which is then interpreted into text by the recognition and voice output software module 17. The recognition and voice output software module 17 identifies French as the language of said user, and said recognition and voice output software module 17 offers to store the user's identity and preferred language for a PVA system in memory 14 or in any other memories accessible by telecommunication means, for example such as a memory of a mobile telephone. The user can then respond with predefined words such as "oui Faurecia" or "no Faurecia" for the data-save authorization. In the event of a positive response to said proposal, the PVA management and activation software module 16 associates the user's identity with the French language for the PVA system. In another example, the user speaks the predefined wake words in a language different from the language used to speak the welcome words, for example "hello Faurecia". In this case, the recognition and voice output software module 17 identifies English as the language of said user, and issues a proposal in the English language for the request to store the user's data and the preferred language for the PVA system. In addition to the preferred language for a PVA system, the user preferences may be, for example, specific music played upon identification of a known user U, a particular display theme for the on-board computer or instrument panel, or any other user-specific vehicle settings.

Once the customized mode of use is determined according to an operating mode, and configured according to the preferences of said user, an activation step (step S18) by said PVA management and activation software module 16 is performed to activate said operating mode of a PVA system.

A voice output step (step S19) is then performed by the recognition and voice output software module 17 and using said speaker 5, indicating to the user U that the use of a mode of use customized according to an operating mode of a PVA system is activated.

In the case of a user U whose identity and preferences are known to the PVA management and activation software module 16, a voice output step (step S20) of welcoming the user in the preferred language is performed using said speaker 5, by said recognition and voice output software module 17 and based on data stored in memory 14.

Steps S18 and S19 are then carried out.

During step S16, in the event of a refusal by the user to store his or her identity and preferences in the database stored in memory 14, or a second lack of response to said proposal in step S15, step S21 is carried out.

In step S21, in the case where the user's language is already identified but said user does not wish to store his or her identity and preferences, the PVA management and activation software module 16 considers the customized mode of use to be a default operating mode of the PVA system, configured with the language said user used to speak the predefined wake words of step S15. In the event of a second failure to respond to said proposal, the PVA management and activation software module 16 considers the customized mode of use to be a default operating mode of the PVA system, and the recognition and voice output software module 17, via said central processing unit 7, emits from said speaker, in different predefined languages, a request for a dialogue language to be used with the default operating mode of a PVA system. A detection of the language used by the user U to respond to said request is then performed, by said recognition and voice output software module 17 and using said acoustic sensor 6. If the user wishes a preferred language for the default operating mode of a PVA system (step S21, OK), steps S18 and S19 for activating a default operating mode of a PVA system in the preferred language of said user are then carried out.

As an example, in step S21, in the case of a second absence to said proposal, the recognition and voice output software module 17 emits via said central processing unit 7, in various languages, "bonjour Faurecia", "Hello Faurecia", "Nihao Faurecia", as well as a request for a dialogue language to be used for the PVA system, and a request to speak the wake words predefined by said user. For example, the user says "Nihao Faurecia", the recognition and voice output software module 17 identifies the Chinese language as the preferred language for said user, and the management and activation module 16 selects the Chinese language for the PVA system in default operating mode.

In step S21, in the event of a refusal by the user or no response to said proposal during a predetermined period (greater than or equal to 10 seconds), a voice output step (step S22) is then carried out by the recognition and voice output software module 17, using said speaker 5, indicating to the user that an operating mode with no PVA system is activated.

As a further example, after the previous steps, the user of the vehicle may also at any time ask the PVA system to initiate the language change process by speaking the predefined wake words in the new desired language. For example, if the language of the PVA system is currently French and the user wishes to switch the PVA system to English, it is sufficient for said user to speak the predefined wake words in the desired language, for example "Hello Faurecia" for English, to trigger the process of changing the preferred language of the PVA system.

The invention claimed is:

1. A method for customizing and activating a personal virtual assistant for a motor vehicle, comprising:
   at least one seat suitable for accommodating a user,
   at least one imaging device having a field of view configured to include said user,
   at least one central processing unit communicating at least with said at least one imaging device,
   the method comprising at least:
      activating a personal virtual assistant (PVA) management system, from said central processing unit,
      determining a customized mode of use of the personal virtual assistant, and
      activating said customized mode of use of the personal virtual assistants;
   wherein said PVA management system is activated by performing: activation of said imaging device, and detection of at least one event indicating the presence of said user by using said at least one imaging device;
   wherein said determination of a customized mode of use of said personal virtual assistant comprises:
      capture of at least one image by said at least one imaging device,
      comparison of said at least one captured image with preexisting user image data, and
      determination, by said central processing unit, of a customized mode of use of the personal virtual assistant, based on the result of said comparison; and
   wherein said customized mode of use comprises:
      a default operation if the result of said comparison is an absence of recognition of the user or a recognition of a user for whom the central processing unit cannot access a language preference for said PVA management system or for the language of wake words,
      absence of operation if the result of said comparison is recognition of a user who does not wish to use the personal virtual assistant, and
      customized operation if the result of said comparison is recognition of a user for whom the central processing unit can access a language preference for said PVA management system or for the language of the wake words.

2. The method according to claim 1, further comprising, when said customized mode of use is a customized operation:
   voice output, by at least one sound-emitting device, at the command of said central processing unit, of welcome words in a language of the personal virtual assistant that is part of the user's prerecorded preferences.

3. The method according to claim 1, further comprising, when said customized mode of use is a default operation:
   voice output, by a sound-emitting device, in a first predefined language, at the command of said central processing unit, of welcome words and of a proposal to store an identity and the preferred language for said user of the PVA management system.

4. The method according to claim 3, further comprising:
   capture, by an acoustic sensor, of a user's voice response to said proposal, and
   detection of a language used in said voice response.

5. The method according to claim 4, wherein in the event of no response to said proposal by said user during a predetermined period of time, said method comprises a voice output in a second predefined language, by said sound-emitting device, at the command of said central processing unit, of said welcome words and a new proposal to store the identity and language preference of the user of said PVA management system.

6. The method according to claim 5, wherein said second predefined language is selected based on geolocation data of said vehicle.

7. The method according to claim 5, further comprising, in the event of no response to said new proposal by said user during a predetermined period of time or in the event of said user refusing to store his or her identity:
   voice output, by said sound-emitting device, at the command of said central processing unit, of said welcome words in various predefined languages, and
   voice output, by said sound-emitting device, at the command of said central processing unit, of a request to speak predefined wake words in the preferred language of said user.

8. The method according to claim 7, wherein, if there is no response during a predetermined period of time to said proposal of a default operating mode or in case of refusal by said user, said personal virtual assistant is deactivated.

9. The method according to claim 1, wherein said determination of a customized mode of use of said personal virtual assistant comprises at least:
   capture, by an acoustic sensor, of a user's voice message;
   detection of the language used in said message; and
   determination of a customized mode of use of the personal virtual assistant, by said central processing unit, based on the result of said detection step.

10. The method according to claim 9, wherein said voice message of the user is a predefined message.

11. The method according to claim 10, wherein said predefined message comprises wake words for the personal virtual assistant.

12. A device comprising:
   at least one seat suitable for accommodating a user,
   at least one imaging device having a field of view configured to include said user,
   at least one central processing unit comprising a computer program implementing a personal virtual assistant, said central processing unit communicating with said at least imaging device and being configured for:
      activating a personal virtual assistant (PVA) management system on command, using said central processing unit,
      determining a customized mode of use of the personal virtual assistant,
      activating said customized mode of use of the personal virtual assistants;
   wherein said PVA management system is activated by performing: activation of said imaging device, and detection of at least one event indicating the presence of said user by using said at least one imaging device;
   wherein said determination of a customized mode of use of said personal virtual assistant comprises:
      capture of at least one image by said at least one imaging device,
      comparison of said at least one captured image with preexisting user image data, and
      determination, by said central processing unit, of a customized mode of use of the personal virtual assistant, based on the result of said comparison; and
   wherein said customized mode of use comprises:
      a default operation if the result of said comparison is an absence of recognition of the user or a recognition of a user for whom the central processing unit cannot access a language preference for said PVA management system or for the language of wake words, absence of operation if the result of said comparison is recognition of a user who does not wish to use the personal virtual assistant, and customized operation if the result of said comparison is recognition of a user for whom the central processing unit can access a language preference for said PVA management system or for the language of the wake words.

13. A vehicle comprising the device according to claim 12.

14. A non-transitory computer-readable medium having stored thereon a computer program that, when executed by an electronic processor, carries out the method according to claim 1.

* * * * *